United States Patent
Nagy

(10) Patent No.: US 9,476,974 B2
(45) Date of Patent: Oct. 25, 2016

(54) METHOD FOR MEASURING THE POSITION OF A SURFACE OF A VEHICLE

(71) Applicant: Kapsch TrafficCom AG, Vienna (AT)

(72) Inventor: Oliver Nagy, Vienna (AT)

(73) Assignee: Kapsch TrafficCom AG, Vienna (AT)

( * ) Notice: Subject to any disclaimer, the term of this patent is extended or adjusted under 35 U.S.C. 154(b) by 232 days.

(21) Appl. No.: 14/266,295

(22) Filed: Apr. 30, 2014

(65) Prior Publication Data

US 2014/0333471 A1 Nov. 13, 2014

(30) Foreign Application Priority Data

May 13, 2013 (EP) .................................... 13167405

(51) Int. Cl.

| G01S 13/06 | (2006.01) |
|---|---|
| G01S 13/00 | (2006.01) |
| G01S 13/87 | (2006.01) |
| G08G 1/015 | (2006.01) |
| G08G 1/052 | (2006.01) |
| G01S 7/41 | (2006.01) |
| G01S 13/42 | (2006.01) |
| G01S 13/91 | (2006.01) |
| G07B 15/06 | (2011.01) |
| G01S 13/89 | (2006.01) |

(52) U.S. Cl.
CPC ................. *G01S 13/06* (2013.01); *G01S 7/41* (2013.01); *G01S 13/003* (2013.01); *G01S 13/426* (2013.01); *G01S 13/878* (2013.01); *G01S 13/91* (2013.01); *G08G 1/015* (2013.01); *G08G 1/052* (2013.01); *G01S 13/89* (2013.01); *G07B 15/06* (2013.01)

(58) Field of Classification Search
CPC .... G01S 13/003; G01S 13/06; G01S 13/426; G01S 13/878; G01S 13/89; G01S 13/91; G01S 7/41; G07B 15/06; G08G 1/015; G08G 1/052
USPC ........................................ 342/133, 139, 146
See application file for complete search history.

(56) References Cited

U.S. PATENT DOCUMENTS

| 2,819,613 A | 1/1958 | Neiley |
|---|---|---|
| 5,132,690 A | 7/1992 | Martin |

(Continued)

FOREIGN PATENT DOCUMENTS

| AU | 628655 B2 | 4/1992 |
|---|---|---|
| DE | 1284137 B | 11/1968 |

(Continued)

OTHER PUBLICATIONS

Extended European Search Report received for EP Patent No. 13167405.3, mailed on Feb. 7, 2014, 13 pages.

(Continued)

*Primary Examiner* — Timothy A Brainard
(74) *Attorney, Agent, or Firm* — Fiala & Weaver P.L.L.C.

(57) ABSTRACT

A method for measuring the position of a surface of a vehicle on a roadway comprising the following steps: transmitting and receiving radar beams at transmitting and receiving positions in various primary transmitting and primary receiving directions and converting these beams into received signals; selecting the received signal having the greatest signal strength; and determining the aforementioned position from the transmitting and receiving positions and the primary transmitting and primary receiving directions of the received signal having the greatest signal strength.

17 Claims, 4 Drawing Sheets

(56) References Cited

U.S. PATENT DOCUMENTS

| | | | | |
|---|---|---|---|---|
| 5,510,794 | A | * | 4/1996 | Asbury ............... G01S 13/24 342/42 |
| 5,717,390 | A | * | 2/1998 | Hasselbring ........... G01S 7/411 235/379 |
| 5,969,641 | A | * | 10/1999 | Nakamura ............ G08G 1/017 235/384 |
| 7,501,976 | B2 | * | 3/2009 | Manor ............... G01S 13/4445 340/933 |
| 2012/0133547 | A1 | * | 5/2012 | MacDonald ......... G01S 13/931 342/70 |

FOREIGN PATENT DOCUMENTS

| | | |
|---|---|---|
| EP | 0015163 A1 | 9/1980 |
| EP | 0016417 A2 | 10/1980 |
| EP | 0636900 A2 | 2/1995 |
| WO | 01/86320 A2 | 11/2001 |

OTHER PUBLICATIONS

Partial Extended European Search Report received for EP Patent No. 13167405.3, mailed on Nov. 21, 2013, 6 pages.

* cited by examiner

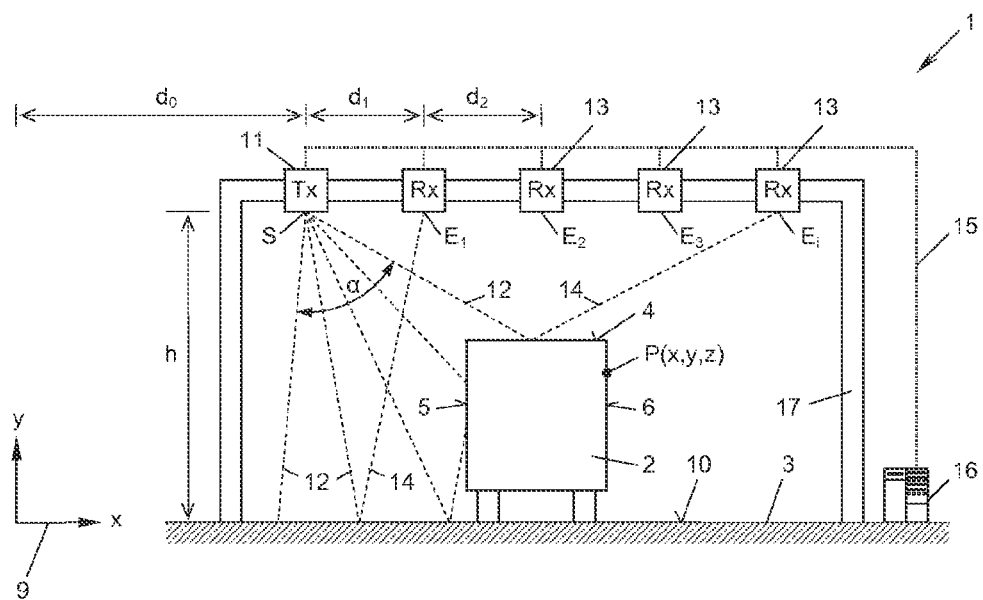
*Fig. 1*
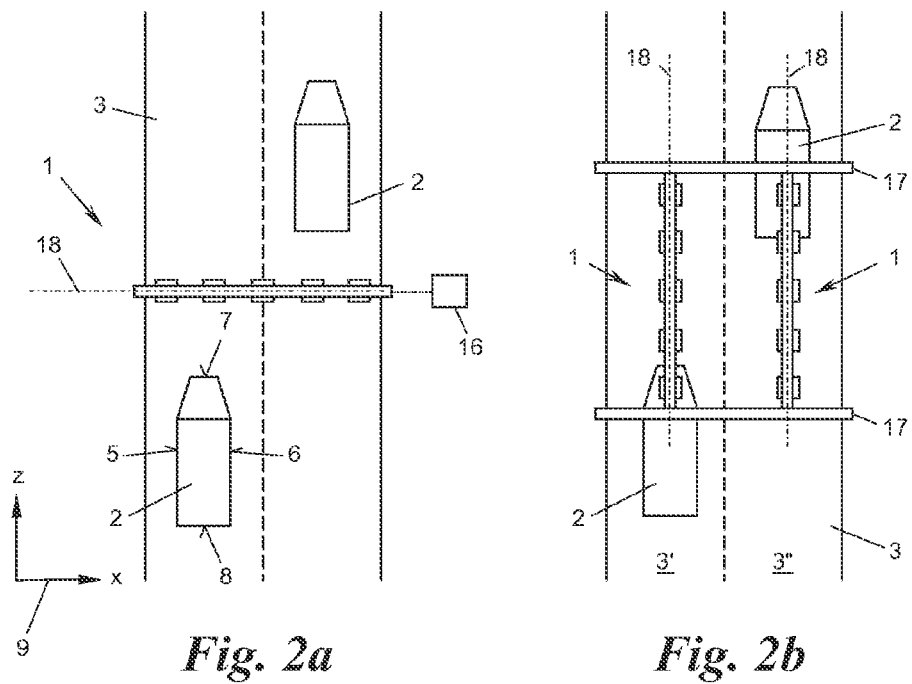
*Fig. 2a*  *Fig. 2b*

METHOD FOR MEASURING THE POSITION OF A SURFACE OF A VEHICLE

CROSS-REFERENCE TO RELATED APPLICATION(S)

This application claims priority to European Patent Application No. 13 167 405.3, filed on May 13, 2013, the entirety of which is incorporated by reference herein.

BACKGROUND

1. Technical Field

The present subject matter relates to methods for measuring the position of a surface of a vehicle on a roadway.

2. Background Art

The measurement of the position of vehicles is important for many tasks in the field of traffic control, traffic monitoring and traffic billing, for example in order to determine the lane used by a vehicle at an electronic traffic control point or tollbooth or also in order to identify the longitudinal position of a vehicle along the roadway so as to be able to assign the vehicle unambiguously to the image of a traffic monitoring camera. The measurement of the position of a surface of the vehicle, for example the roof or side faces thereof, is of significance in order to determine the size of the vehicle and therefore classify said vehicle, for example in order to determine whether the vehicle is a passenger vehicle or lorry, for example so as to be able to check and enforce traffic restrictions or toll fees dependent on vehicle class.

Predominantly optical systems, such as laser scanners or video cameras, are currently used for position measurement. These systems are reliant on good visibility and are therefore highly dependent on the weather; they often fail in rain, snow or spray. The optics of laser scanners and video cameras also requires frequent cleaning in order to remain ready for use, and these systems have a limited service life and a limited temperature range due to mechanically moved parts.

In sub-areas such as traffic flow monitor systems, radar systems are also currently used which, from a raised point, for example an antenna mast next to a motorway, detect moved vehicles by means of Doppler radar and can track the movement of said vehicles in a radar image. The accuracy of the position measurement of such radar systems is limited, and the Doppler evaluation of the vehicle speeds requires a high processing effort in order to create the traffic flow image.

BRIEF SUMMARY

An object of the disclosed subject matter is to create novel methods for measuring the position of vehicle surfaces, said methods being less susceptible to failure than the known optical methods and being simpler, more cost effective and more accurate than the known radar methods.

This object is achieved by a method of the type mentioned above, comprising the steps:

a) transmitting a first radar beam from a transmitting position above the plane of the roadway in a first primary transmitting direction inclined downwardly at an angle, receiving a first reflected radar beam at a receiving position above the plane of the roadway in a first primary receiving direction inclined downwardly at an angle, and converting the first reflected radar beam into a first received signal, wherein the transmitting position and the receiving position are distanced from one another and the first primary transmitting direction and the first primary receiving direction lie in a common plane;

b) transmitting a second radar beam from the transmitting position in a second primary transmitting direction inclined downwardly at an angle, receiving a second reflected radar beam at the receiving position in a second primary receiving direction inclined downwardly at an angle, and converting the second reflected radar beam into a second received signal, wherein the second primary transmitting direction and the second primary receiving direction lie in said common plane:

c) selecting the received signal having the greatest signal strength; and d) determining the said position from the transmitting and receiving positions and from the primary transmitting and primary receiving directions of the received signal having the greatest signal strength;

wherein steps a) and b) are performed either chronologically in succession or at the same time.

Embodiments concern the use of a radar beam of which the direction can be controlled and the use of an evaluation of the received signals of the radar receiver at different angular positions, wherein the strongest received signal indicates the transmitting and receiving directions in which the reflection on the sought surface occurs; individual measurement points in the measurement plane spanned by the transmitting and receiving directions can thus be determined using simple geometric calculations on the basis of the known transmitting and receiving positions and also the transmitting and receiving directions (angle), determined in this way, with respect to the roadway as a reference plane and where appropriate a secondary reflection plane. To this end, neither Doppler measurements, interference measurements or time-of-flight measurements are necessary; simple evaluations of the signal strengths of the received signals are sufficient, thus significantly simplifying the computational evaluation of the measurement method. The method can therefore also be carried out using a plurality of radar transmitters and radar receivers, which for example are arranged at the same roadway in order to obtain measurement points distributed over the roadway.

In some embodiments the radar beams may be CW (continuous wave) or FMCW (frequency modulated continuous wave) radar beams and the evaluation device for example evaluates merely the signal strengths of the received signals. For distance measurement, the evaluation device can carry out, for example, interference or FMCW measurements on CW or FMCW radar beams.

In an alternative embodiment the radar beams contain transmitted pulses and the received signals consequently contain received pulses, wherein only received signals of which the received pulses lie within a predefined time window after a transmitted pulse are taken into account for said selecting. The time windows (range gates) can be set such that multiple reflections of the radar beams, for example on surrounding objects of no interest or between the floor plate of the vehicle and the roadway, are gated in order to increase the measurement accuracy and in order to reduce the susceptibility to failure.

The measurement apparatus can be used to measure different surfaces of a vehicle depending on the angular position of the aforementioned primary transmitting and receiving directions. In accordance with a first embodiment each primary transmitting direction and associated primary receiving direction are parallel to one another in order to measure the position of a substantially vertical surface; in accordance with an alternative embodiment each primary transmitting direction and associated primary receiving direction are inclined with respect to the vertical in a mirror-inverted manner in order to measure the position of a substantially horizontal surface. The first embodiment measures vertical surfaces, for example the side or end walls of a vehicle, via the detour of a secondary reflection on the substantially horizontal roadway (corner effect). The second embodiment directly measures the primary reflection on a horizontal surface, for example the roof or engine cover of the vehicle.

In a further embodiment, not only are just two primary transmitting and primary receiving directions used for the method, but many different primary transmitting and primary receiving directions in order to obtain more than two received signals, from which the received signal having the greatest signal strength is selected. A plurality of measurement points can thus be obtained in the aforementioned common plane.

A further embodiment of the method lies in using at least one further receiving position to obtain further received signals, wherein the received signal having the greatest signal strength is selected from all received signals and further received signals. It is thus possible to obtain even more measurement points, for example even distributed over the width of the roadway, in order to increase the measurement range (the "aperture") of the measurement method. To this end, the receiving position and the further receiving position may, for example, lie in the said common plane, and therefore the plane forms a measurement plane, for example transversely to the roadway or in the longitudinal direction of the roadway, within which a plurality of measurement points can be scanned by controlling the respective transmitting and receiving directions and selecting the respective receiving position.

In an example embodiment, the said measurement plane may lie transversely to the roadway, such as by using a mounting gantry which spans the roadway transversely and on which radar transmitters and radar receivers for transmitting and receiving the radar beams are mounted. Positions of the vehicle or of a surface thereof can thus be determined in this plane with high accuracy and using simple computational means, for example the lane used by the vehicle, the height of the roof of the vehicle with respect to the roadway, or the position of a side face of the vehicle. In an alternative embodiment the radar transmitter and radar receivers could also lie in a plane oriented along the roadway or running at an angle to the roadway, such that the position of the vehicle or of an end face of the vehicle can also be determined in the longitudinal direction of the roadway.

Due to the simple design of the radar transmitter and receivers, of which only the direction needs to be controllable, for example by means of pivotable antennas or by selection from a plurality of non-adjustable directional antennas, very lightweight components can be used which also lead to an accordingly lightweight and therefore cost-effective mounting gantry construction. In an example embodiment the primary transmitting and primary receiving directions are set by means of phase-controlled antenna arrays, which eradicates the need for mechanically moved parts and enables a maintenance-free and durable construction.

In both variants, a pulse time-of-flight measurement can additionally be carried out if pulsed radar beams are used so as to increase the measurement accuracy. To this end, pulse time-of-flight measurements are carried out between transmitting and received pulses and the distance between the surface and the transmitting and receiving positions is determined on the basis of said measurements in order to improve the position measurement. Alternatively, the radar beams may be FMCW radar beams and the distance between the surface and the transmitting and receiving positions can be determined therefrom in accordance with the FMCW method, or the radar beams may be CW radar beams and the distance between the surface and the transmitting and receiving positions can be determined therefrom in accordance with a phase interference method in order to improve the position measurement.

In accordance with a further embodiment the radar beams are transmitted and received by radar transceivers, which are each operated selectively as a transmitter or receiver in code, time or frequency multiplex. On the one hand the manufacturing and assembly outlay can thus be simplified because uniform components, specifically radar transceivers, can be assembled that are merely controlled and evaluated differently. On the other hand more measurement points can thus be measured using the same arrangement: the individual components may act selectively as transmitters or receivers at their respective assembly position, whereby more combination possibilities and therefore more measurable points in the measurement plane are produced.

The method is suitable for all types of radar, whether pulse, CW or FMCW radar, wherein the radar beams can also be modulated or coded in a wide range of manners. Very high-frequency radar beams, such as in the frequency range from 1 GHz to 100 GHz, including, for example, in the frequency range of 50 GHZ to 100 GHz, may be used in embodiments. This leads to very small antenna arrangements, which have heavily bundled directivities, even with small dimensions, and provides the possibility of mounting a plurality of lightweight transmitters and receivers or transceivers on a mounting gantry, which in turn can be dimensioned so as to be accordingly small and is therefore more cost effective than for conventional optical position measurement systems.

Further features and advantages, as well as the structure and operation of various embodiments, are described in detail below with reference to the accompanying drawings.

BRIEF DESCRIPTION OF THE DRAWINGS/FIGURES

The present subject matter will be explained in greater detail hereinafter on the basis of exemplary embodiments illustrated in the accompanying drawings, in which:

FIG. 1 schematically shows an example of an apparatus for position measurement as viewed in the longitudinal direction of a roadway.

FIG. 2a shows the apparatus of FIG. 1 in plan view.

FIG. 2b shows an alternative embodiment of the apparatus in plan view.

DETAILED DESCRIPTION

Figure 3:
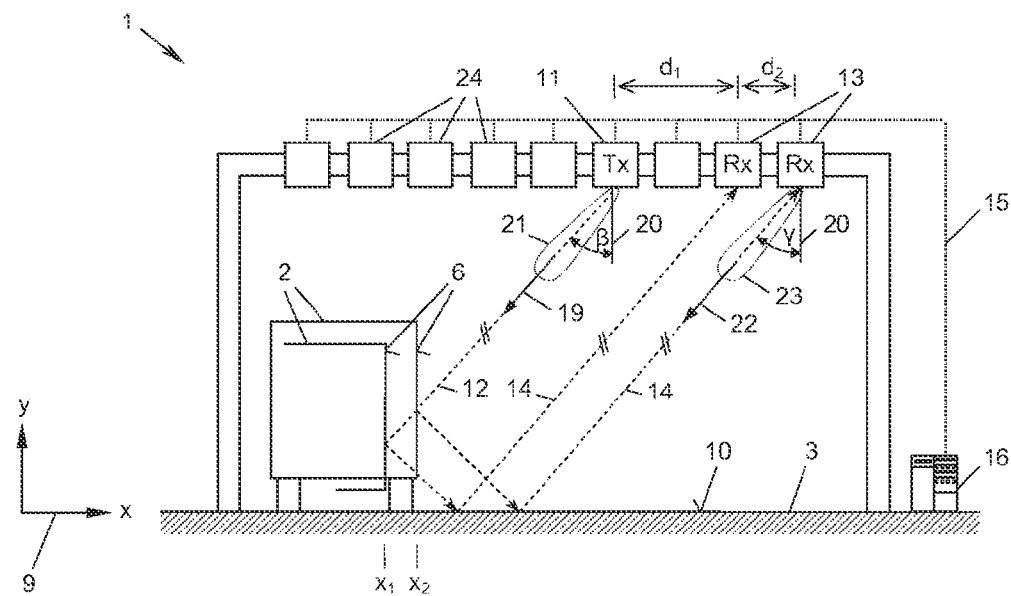
FIGS. 3 and 4 show the geometric conditions in the case of the measurement of a side face (FIG. 3) and roof (FIG. 4) of a vehicle with the aid of two exemplary method variants.

Embodiments will now be described with reference to the accompanying drawings.

An apparatus 1 for measuring the position of a vehicle 2 on a roadway 3 is shown in FIGS. 1 and 2a. The term "position" is understood here in its most general form and includes one, two or three of the coordinates x, y, z of any point P of the vehicle 2 or one of the surfaces thereof, for example a roof 4, side face 5, 6 or end face 7, 8, in a coordinate system 9. The coordinate system 9 may, for example, be based on the position of the apparatus 1 with respect to the roadway 3; in the present example the plane 10 of the roadway 3 lies in the x/z plane of the coordinate system, the longitudinal direction of the roadway runs in the z direction, and the transverse direction of the roadway runs in the x direction; the y coordinate defines the height of a point P above the roadway plane 10.

The apparatus 1 comprises a radar transmitter 11, which is arranged in a transmitting position S above the plane 10 of the roadway 3 and transmits radar beams 12 downwardly, and also a plurality of radar receivers 13, which are arranged at various receiving positions $E_1$, $E_2$, ..., generally $E_i$, likewise above the roadway plane 10, and receive reflections 14 of the radar beams 12 from beneath. The radar receivers 13 convert the received reflected radar beams 14 into a received signal $R_1$, $R_2$, ..., generally $R_i$, (FIGS. 7 and 8), which they transmit via a line 15 to an evaluation device 16 for evaluation; the evaluation device 16 is also connected via the line 15 to the radar transmitter 11 in order to control said radar transmitter.

Each of the radar receivers 13 are arranged at distances $d_1$, $d_2$, ..., generally $d_i$, from the radar transmitter 11 and from one another, that is to say they are distributed above the plane 10. In the shown example, the radar transmitter 11 and all radar receivers 13 are mounted on a common mounting gantry 17 at a common mounting height h and in a common plane 18 spanning the roadway 3 transversely. The radar beams 12 and reflected radar beams 14 also run in this plane 18, which in this example constitutes the measurement plane of the apparatus 1. The radar transmitter 11 and the radar receivers 13 could also be mounted at individual, different heights $h_i$, and/or could be arranged at irregular distances $d_i$, and/or could not lie in a common plane; the latter facilitates the trigonometric calculations however.

The measurement plane 18 in which the radar beams 12, 14 lie, may also be inclined with respect to the x axis and/or rotated about the y axis, and more than one measurement plane 18 may also be provided. FIG. 2b shows an embodiment with two apparatus 1 of which the measurement planes 18 each run parallel to the y/z plane above a lane 3', 3" of the roadway 3 in order to measure positions of the vehicle 2 or end faces 7, 8 thereof in the longitudinal direction z of the roadway 3.

The radar transmitter 11 and radar receivers 13 can transmit and receive respectively any types or radar beams 12, 14 known in the art, for example CW radar beams or pulsed radar beams. The evaluation device 16 may accordingly also perform conventional interference and/or pulse time-of-flight measurement methods on the radar beams 12, 14 in order to measure distances from the measurement points P.

The embodiment of FIG. 1 operates by the principle of detection of a shadowing of the radar beams 12 and 14 by an object located in the measurement plane 18, such as the vehicle 2. The evaluation device 16 for this purpose evaluates the signal strengths, for example amplitudes or received signal strengths (received signal strength indications, RSSIs) of the received signals $R_i$ of the various radar receivers 13 and compares these with one another for example or with predefined threshold values in order to determine the radar receiver(s) 13 which receives/receive a comparatively weaker or even no received signal $R_i$: in this case, the vehicle 2 covers the path of propagation from the radar transmitter 11 to said radar receiver 13.

In the knowledge of the transmitting and receiving positions S, $E_i$ (for example assembly heights h and distances $d_i$), and in the knowledge of the transmitting angle α, via which the radar transmitter 11 transmits its radar beams 12, it is thus possible to approximately determine the position of the vehicle 2 in the measurement plane 18. The more radar receivers 13 that are provided, that is to say the more densely these are arranged, the more accurately can the approximate position of the vehicle 2 be determined from the shadowing of one or more radar receivers 13.

The position measurement can be improved if the distance between a reflecting surface of the vehicle 2, here the roof 4 for example, and a radar receiver 13 is additionally measured, for example on the basis of interference measurements on CW radar beams or time-of-flight measurements on pulsed radar beams, from which additional information the shadowing information can be verified and improved in order to localise more accurately the position of the vehicle 2, for example of a reference point P thereof, in the measurement plane 18.

Figure 4:
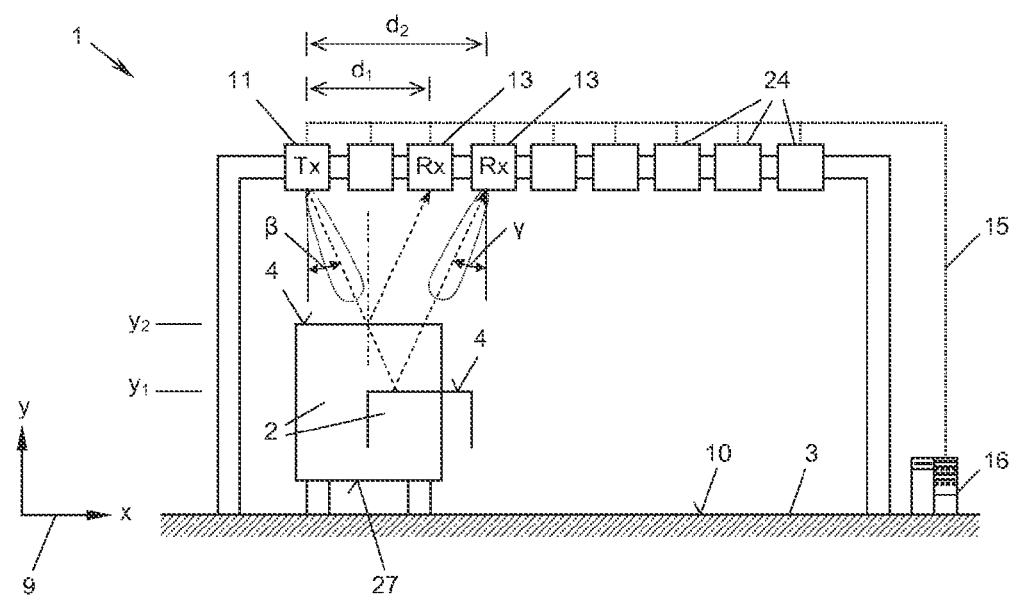

FIGS. 3 and 4 show a measuring principle of the apparatus 1 used alternatively or additionally to FIG. 1. In the embodiment of FIGS. 3 and 4, directed radar beams 12 are used, that is to say the radar transmitter 11 transmits its radar beams in a primary transmitting direction 19, which runs at an angle β to the vertical 20 in the measurement plane 18. Of course, radar beams 12 may not be bundled completely exactly in a single direction, but each radar antenna in practice has a lobe-shaped direction characteristic 21, wherein the central axis of the primary lobe 21 of the radar transmitter 13 is considered to be the primary transmitting direction 19. The opening or bundling angle of the transmitting lobe 21 depends on the directivity of the antenna of the radar transmitter 11, which is also defined by what is known as the "antenna gain", measured in dB. For example, a radar transmitter 11 with an antenna gain of 20 dB achieves good directivity with an opening angle (half width) of the transmitting lobe 21 of a few degrees or a few steradians. The stronger the directivity of the radar transmitter 11, that is to say the higher the antenna gain of the antenna thereof, the more radar energy lies in the primary transmission direction 19 and the more accurate is the position measurement described hereinafter, because more radar receivers 13 can be used at smaller distances $d_i$.

With use of radar transmitter 11 directed in this way, the position of a substantially vertical side face or end face 5-8 (FIG. 3) or of a substantially horizontal roof 4 (FIG. 4) of the vehicle 2 can now be measured in the measurement plane 18.

The measurement principle of FIG. 3 utilises the corner effect (cat's eye reflector effect) of a secondary reflection of the laser beam 12 at the plane 10 of the roadway 3, which forms an approximate right angle with the vertical surface to be measured, for example the side wall 5, 6 or end wall 7, 8. As shown in FIG. 3, the reflected laser beam 14 contacts different radar receivers 13 depending on the x position $x_1$, $x_2$ of the side wall 6 of the vehicle 2 with constant primary transmitting direction 19. Depending on the x position of the side face 6, a different radar receiver 13 thus receives the strongest received signal $R_i$. By evaluating the signal strengths of the received signals $R_i$ of the radar receivers 13 in the evaluation device 16, the radar receiver 13 that receives the strongest received signal $R_i$ can thus be determined. The position, here the x coordinate, of the side face 6 of the vehicle 2 in the coordinate system 9 can thus be determined from the known receiving position $E_i$ of this radar receiver 13 and the other known geometric dimensions, such as transmitting position S and angle $\beta$. This merely requires a simple trigonometric calculation of the geometric conditions shown in FIG. 3 and requires neither an evaluation of pulse times-of-flight nor a Doppler evaluation of the laser beams 12, 14. Of course, the position measurement result can also be improved additionally by optional consideration of times-of-flight and distance measurements at the laser beams 12, 14.

FIG. 4 shows the slightly modified principle of the measurement of a horizontal surface, such as the roof 4. As can be seen, the laser beam 12 emitted at the angle $\beta$ in the primary transmitting direction 19 contacts different radar receivers 13 at different heights $y_1$, $y_2$ of the roof 4 of the vehicle 2, and therefore the position, here the y coordinate, of the roof 4 of the vehicle 2 can be calculated again from the receiving position $E_i$ of the radar receiver 13 that receives the greatest received signal $R_i$, and from the known values of transmitting position S and angle $\beta$ by means of trigonometric calculation.

In the embodiments in FIGS. 3 and 4, the selection of the strongest received signal $R_i$ and therefore of the radar receiver 13 affected most severely by the reflected radar beam 14 can be improved by also equipping the radar receivers 13 with directional antennas, that is to say a primary receiving direction 22, which corresponds to the axis of a receiving lobe 23 of the respective radar receiver 13. In the embodiment of FIG. 3 the primary receiving direction 22, represented here by the angle $\gamma$ to the vertical 20, is for this purpose set parallel to the primary transmitting direction 19 ($\beta=\gamma$); and in the embodiment of FIG. 4 the primary receiving direction 22 with respect to the vertical 20 is for this purpose set in a manner mirrored in relation to the primary transmitting direction 19 ($\gamma=-\beta$).

As can be seen from FIG. 3 and FIG. 4, a radar transceiver 24 can also be used for each of the radar transmitter and receivers 11, 13. In other words, a transceiver 24 is arranged at the transmitting and receiving positions S, $E_1$ and can be operated selectively just as a radar transmitter 11 and just a radar receiver 13. The selection of the operating mode of the respective transceiver 24 can be controlled here in time multiplex by the evaluation device 16, that is to say this selects the moment at which a transceiver 24 functions as a radar transmitter 11 or as a radar transceiver 13.

In an example embodiment, at any specific moment in time, only one of the transceivers 24 may be active as a radar transmitter 11 and all other transceivers may be active as radar receivers 13 (time multiplex method; TDMA, time division multiplex access). This is not absolutely necessary however; a plurality of radar transmitters 11 may also be operated simultaneously, for example at different frequencies (frequency multiplex method; FDMA, frequency division multiplex access) or by means of different orthogonal codings or modulations (code multiplex method; CDMA, code division multiple access), such that the apparatus 1 is composed of a plurality of "sub" apparatus 1 so to speak, that is to say in each case of a combination of a radar transmitter 11 and a number of radar receivers 13. It is also clear that the positions S of the radar transmitter 11 and $E_i$ of the radar receivers 13 are arbitrary and exchangeable above the plane 10 of the roadway 3 and are selected for the desired measurement arrangement, that is to say the desired region of measurement points in the measurement plane 13.

Figure 5:
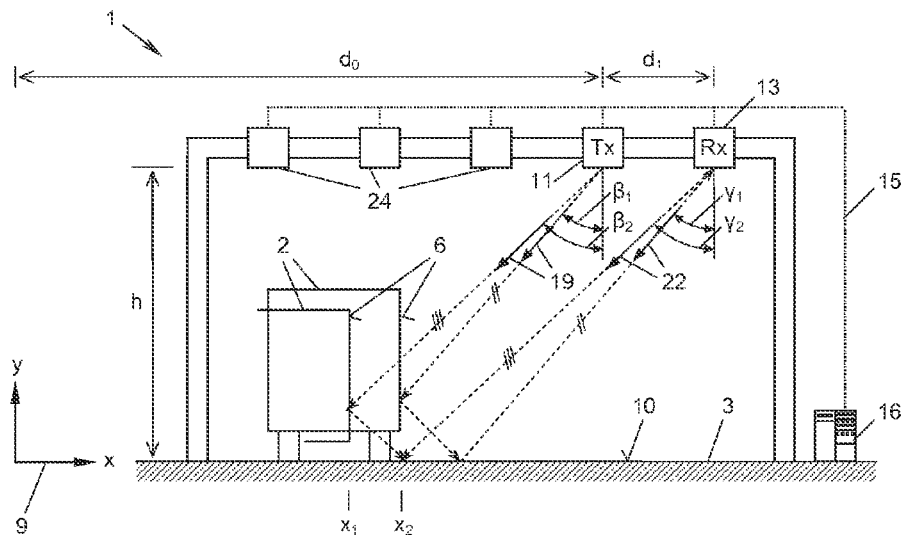
FIGS. 5 and 6 show the geometric conditions in the case of the measurement of a side face (FIG. 5) and roof (FIG. 6) of a vehicle with the aid of two further exemplary method variants.
Figure 6:
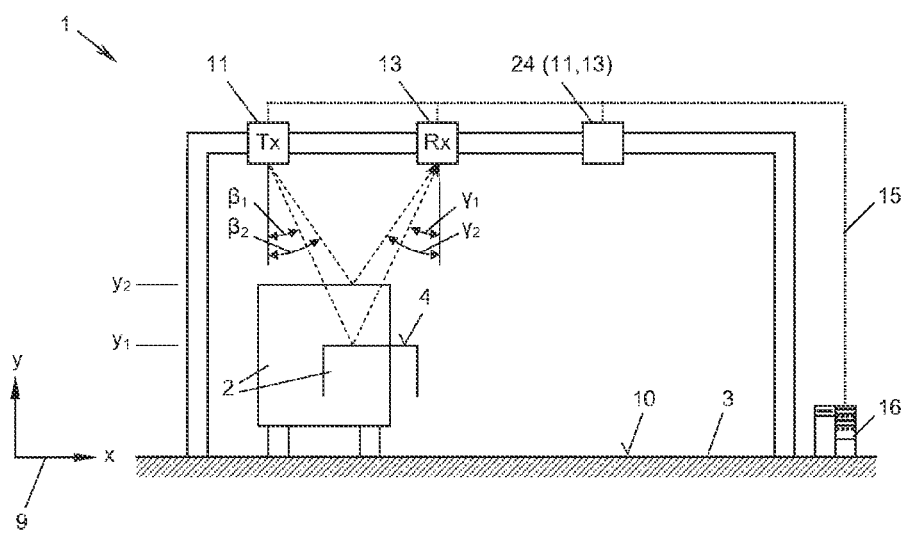

FIGS. 5 and 6 show a further measuring principle of the apparatus 1 in FIGS. 1 to 4, which can be used alternatively or additionally to the measuring principles of FIGS. 1 to 4. A pair (formed from the transceivers 24) of a radar transmitter 11 and a radar receiver 13, which are each equipped with directional antennas of which the direction can be controlled, is used in each of FIGS. 5 and 6: both the primary transmitting direction 19 of the radar transmitter 11 and the primary receiving direction 22 of the radar receiver 13 can be controlled, that is to say the respective angles thereof $\beta$ and $\gamma$ in the measurement plane 18 can be changed. Here, FIGS. 5 and 6 each show two exemplary angular positions $\beta_1$, $\beta_2$ and $\gamma_1$ and $\gamma_2$ of the primary transmitting and primary receiving directions 19, 22 respectively.

In FIG. 5, the primary transmitting and primary receiving directions 19, 22 are each selected in parallel in order to measure vertical surfaces 5-8 of the vehicle 2: $\beta_1=\gamma_1$ at a first moment in time $t_1$, and $\beta_2=\gamma_2$ at a second moment in time $t_2$. In the embodiment of FIG. 6, primary transmitting and primary receiving directions 19, 22 parallel with the vertical 20 are used to measure horizontal surfaces 4, that is to say $\beta_1=-\gamma_1$ at a first moment in time $t_1$, and $\beta_2=-\gamma_2$ at a second moment in time $t_2$. Of course, the primary transmitting and receiving directions 19, 22 of the radar transmitter 11 and of the radar receiver 13 can also be brought into further positions at further moments in time $t_3$, $t_4$ . . . , generally $t_i$; for example, the primary transmitting and primary receiving directions 19, 22 are pivoted over an angular range continuously or in a discretised manner.

Due to the successive use of different primary transmitting and receiving directions 19, 22 or angles $\beta$, $\gamma$, different measurement points in the measurement plane 18 can thus be "scanned"; the reflection on the surface to be measured 6 (FIG. 5) or 4 (FIG. 6) has clearly occurred in the angular position $\beta$, $\gamma$ or primary transmitting and receiving direction 19, 22 in which the strongest received signal $R_i$ is received in the radar receiver 13. In the knowledge of the known transmitting and receiving positions S, $E_i$ of the radar transmitter 11 and radar receiver 13 (here: assembly height h and distances $d_i$), the x coordinate of the side wall 6 (FIG. 5) or the y coordinate of the roof 4 (FIG. 6) can then be calculated again by means of trigonometric calculations from the direction 19, 22 or $\beta$, $\gamma$ thus found.

To control the direction of the radar transmitter and radar receivers 11, 13, these can be equipped for example with mechanically pivotable directional antennas, with a plurality of non-adjustable directional antennas that can each be selected in an arbitrary manner, or, for example, with phase-controlled antenna arrays (phased arrays), of which the latter, as is known to a person skilled in the art, develop directivity in a desired direction as a result of different phase control of a plurality of antennas arranged side by side. The directional control is also used not only to determine the position of an individual point, but to determine (to "scan") the position of an entire surface by pivoting the antenna radiation direction.

Instead of a chronologically successive use of different primary transmitting and primary receiving directions 19, 22 or angles $\beta$, $\gamma$, these can also be used simultaneously if the radar transmitter 11 and the radar receivers 13 each have a plurality of differently oriented directional antennas, as explained below in greater detail with reference to FIG. 8.

Of course, the embodiment in FIGS. 3 and 4 on the one hand and the embodiment in FIGS. 5 and 6 on the other hand can also be combined with one another. For example, in the case of the radar transmitter and receivers 11, 13 in the embodiment in FIGS. 5 and 6, of which the direction can be controlled, additional radar receivers 13 at other receiving positions $E_1$ can thus also be evaluated by the evaluation device 16, and the radar receiver 13 which guides the strongest received signal $R_i$ in a specific angular position β, γ is used for the trigonometric evaluation. The measurement range (the "aperture") of the measurement apparatus in FIGS. 5 and 6 can thus be widened, for example over the entire width of the roadway 3 (FIG. 2a) or over a longer longitudinal portion of the roadway (FIG. 2b). Conversely, in the embodiment in FIGS. 3 and 4, these directions β, γ can additionally be varied in order to obtain additional measurement or scanning points in the measurement plane 18 using the same number of radar receivers 13.

Figure 7:
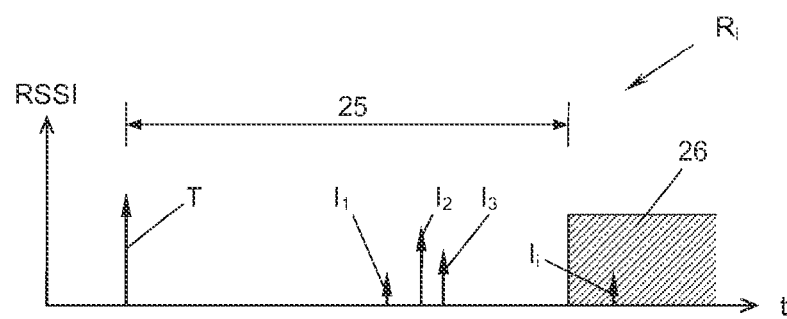
FIG. 7 shows a time graph of the range-gating embodiment of the methods.

FIG. 7 shows the principle of "range gating" by establishing a time window 25 after a transmitted pulse T of a pulsed radar beam 12. Only received pulses $I_1$ occurring in the received signals $R_i$ of the radar receivers 13 within the time window 25 are taken into consideration; a received pulse $I_4$ arriving after the time window 25 ("too late") within the subsequent gate window 26 is not taken into consideration, that is to say the evaluation device 16, when performing its signal strength comparison, ignores those received signals $R_i$ received by radar receivers 13 which relate to a received pulse outside the time window 25 after the associated transmitted pulse T. Similarly, other time-of-flight measurement principles, such as FMCW (frequency modulated continuous wave) methods, can also be applied for the "range gating", as is known to a person skilled in the art.

Multiple reflections of the radar beams 13, as occur for example on surrounding objects, such as the mounting gantry 17 or for example between the floor plate 27 of the vehicle 2 and the roadway 3, and lead to longer signal times-of-flight, can thus be gated, such that merely primary reflections on the vehicle 2 (FIGS. 1, 4 and 6) or primary and secondary reflections on the vehicle 2 and the roadway 3 (FIGS. 3 and 5) are taken into consideration in the measurement.

Figure 8:
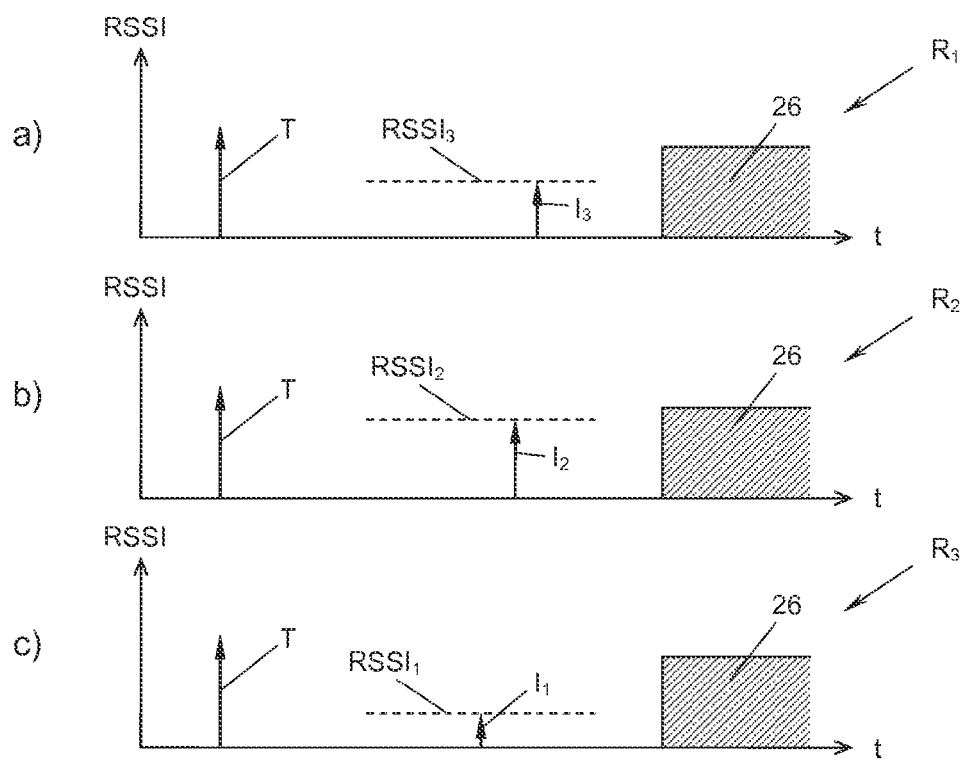
FIG. 8 shows a time diagram of the received signals within the scope of the method according to FIGS. 5 and 6.

FIG. 8 shows the received signal $R_i$ of a single radar receiver 13 of the embodiment in FIGS. 5 and 6 in successive stages a, b, c, . . . of the measurement method, which each correspond to a different angular position β, γ of the primary transmitting and primary receiving directions 19, 22, over time t. As can be seen, received signals $R_1$, $R_2$, $R_3$ having different signal strengths $RSSI_3$, $RSSI_2$, $RSSI_1$ (or, in the case of pulsed radar beams, having received pulses $I_3$, $I_2$, $I_1$ of varying strength) occur at different angles $β_1$, $γ_1$; $β_2$, $γ_2$; $β_3$, $γ_3$. By plotting the received signals $R_i$ or pulses $I_i$ in the successive stages a, b, c and then comparing the signal strengths $RSSI_i$ or pulses $I_i$, the angular position $β_1$, $γ_1$ in which the maximum signal strength $RSSI_i$ occurs can now be determined. Again, the angles $β_1$, $γ_1$ are therefore found and the position of the surface 6 or 4 respectively to be measured can be calculated on the basis of the aforementioned trigonometric calculations.

In any embodiment in which the radar transmitter and receivers 11, 13 have a plurality of directional antennas oriented in the various angles $β_1$, $γ_1$; $β_2$, $γ_2$; $β_3$, γ3, such that the aforementioned measurements can be carried out simultaneously in the various primary transmitting and primary receiving directions 19, 22, the received signals $R_i$ shown in FIG. 8 simultaneously constitute the received signals of various directional antennas a), b), c) . . . of the radar receiver 13. The received signals $R_i$ are thus obtained not in successive stages, but simultaneously at the outputs of various directional antennas a), b), c) . . . of the same radar receiver 13.

In this embodiment too, the directional antenna a), b), c) . . . of the radar receiver 13 and therefore the angular position $γ_i$ ($γ_i=β_i$ in FIG. 5; $γ_i=-β_i$ in FIG. 6) in which the maximum signal strength $RSSI_i$ occurs can again be determined by comparison of the signal strengths $RSSI_i$ or pulses $I_i$. The angles $β_i$ and $γ_i$ are thus found again and the position of the respective surface 6 or 4 to be measured can again be calculated on the basis of the aforementioned trigonometric calculations. This variant can also be combined with all of the aforementioned variants of the method and the apparatus.

CONCLUSION

The invention is accordingly not limited to the presented embodiments, but includes all variants, modifications and combinations of the presented measures falling within the scope of the accompanying claims.

What is claimed is:

1. A method for measuring a position of a surface of a vehicle on a roadway, comprising the steps:
 a) transmitting a first radar beam from a transmitting position above the plane of the roadway in a first primary transmitting direction inclined downwardly at an angle, receiving a first reflected radar beam at a receiving position above the plane of the roadway in a first primary receiving direction inclined downwardly at an angle by means of a controllable directional antenna directed in said first primary receiving direction, and converting the first reflected radar beam into a first received signal, wherein the transmitting position and the receiving position are distanced from one another and the first primary transmitting direction and the first primary receiving direction lie in a common plane;
 b) transmitting a second radar beam from the transmitting position in a second primary transmitting direction which is different from the first primary transmitting direction and inclined downwardly at an angle, receiving a second reflected radar beam at the receiving position in a second primary receiving direction which is different from the first primary receiving direction and inclined downwardly at an angle by means of the controllable directional antenna directed in said second primary receiving direction, and converting the second reflected radar beam into a second received signal, wherein the second primary transmitting direction and the second primary receiving direction lie in said common plane;
 c) selecting the received signal having the greatest signal strength; and
 d) determining the said position from the transmitting and receiving positions and from the primary transmitting and primary receiving directions of the received signal having the greatest signal strength;
 wherein steps a) and b) are carried out either chronologically in succession or at the same time.

2. The method according to claim 1, wherein the radar beams are CW (continuous wave) or FMCW (frequency modulated continuous wave) radar beams.

3. The method according to claim 1, wherein the radar beams contain transmitted pulses and the received signals consequently contain received pulses, wherein only those received signals of which the received pulses lie within a predefined time window after a transmitted pulse are taken into account for said selecting.

4. The method according to claim 3, wherein pulse time-of-flight measurements between transmitted and received pulses are carried out and the distance between the surface and the transmitting and receiving positions is determined therefrom, in order to improve the position measurement.

5. The method according to claim 1, wherein each primary transmitting direction and associated primary receiving direction are parallel to one another, in order to measure the position of a substantially vertical surface.

6. The method according to claim 1, wherein each primary transmitting direction and associated primary receiving direction are inclined with respect to the vertical in a mirror-inverted manner, in order to measure the position of a substantially horizontal surface.

7. The method according to claim 1, wherein more than two different primary transmitting and primary receiving directions are used in order to obtain more than two received signals, from which the received signal having the greatest signal strength is selected.

8. The method according to claim 1, wherein at least one further receiving position is used in order to obtain further received signals, wherein the received signal having the greatest signal strength is selected from all received signals and further received signals.

9. The method according to claim 8, wherein the receiving position and the further receiving position lie in the said common plane.

10. The method according to claim 1, wherein the said common plane lies transversely to the roadway.

11. The method according to claim 10, wherein a mounting gantry spanning the roadway transversely is used, on which radar transmitters and radar receivers for transmitting and receiving the radar beams are mounted.

12. The method according to claim 1, wherein the primary transmitting and primary receiving directions are set by means of phase-controlled antenna arrays or an arbitrary selection of individual directional antennas.

13. The method according to claim 1, wherein the radar beams are FMCW (frequency modulated continuous wave) radar beams and the distance between the surface and the transmitting and receiving positions is determined therefrom in accordance with the FMCW method, in order to improve the position measurement.

14. The method according to claim 1, wherein the radar beams are CW (continuous wave) radar beams and the distance between the surface and the transmitting and receiving positions is determined therefrom in accordance with a phase interference method, in order to improve the position measurement.

15. The method according to claim 1, wherein the radar beams are transmitted and received by radar transceivers, which are each operated selectively as a transmitter or receiver in code, time or frequency multiplex.

16. The method according to claim 1, wherein a frequency of the radar beams is 1 GHz to 100 GHz.

17. The method according to claim 1, wherein a frequency of the radar beams is 50 GHz to 100 GHz.

* * * * *